(12) United States Patent
Cholhan et al.

(10) Patent No.: US 10,140,841 B2
(45) Date of Patent: *Nov. 27, 2018

(54) EMERGENCY NOTIFICATION APPARATUS AND METHOD

(71) Applicant: Choprix LLC, Rochester, NY (US)

(72) Inventors: Hilary J. Cholhan, Rochester, NY (US); Remy Cholhan, Rochester, NY (US)

(73) Assignee: Choprix, LLC, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,948

(22) Filed: Mar. 7, 2016

(65) Prior Publication Data

US 2016/0189530 A1 Jun. 30, 2016
US 2017/0148305 A9 May 25, 2017

Related U.S. Application Data

(63) Continuation of application No. 14/227,493, filed on Mar. 27, 2014, now Pat. No. 9,311,801.

(60) Provisional application No. 61/805,573, filed on Mar. 27, 2013.

(51) Int. Cl.
| G08B 1/08 | (2006.01) |
| G08B 25/01 | (2006.01) |
| H04W 4/90 | (2018.01) |
| G08B 21/02 | (2006.01) |
| H04W 4/021 | (2018.01) |

(52) U.S. Cl.
CPC ........... *G08B 25/016* (2013.01); *G08B 21/02* (2013.01); *H04W 4/021* (2013.01); *H04W 4/90* (2018.02)

(58) Field of Classification Search
CPC .............. G08B 25/016; G08B 21/0269; G08B 21/0202; H04W 4/02
USPC ............ 340/539.13, 539.11, 539.15, 539.21, 340/573.1, 13.24; 455/73, 92, 100
See application file for complete search history.

(56) References Cited

U.S. PATENT DOCUMENTS

| 5,200,736 A | 4/1993 | Coombs et al. | |
| 6,889,942 B2 | 5/2005 | Preston | |
| 6,960,996 B2 * | 11/2005 | Sackl | A63B 29/021 340/539.11 |
| 8,604,925 B2 * | 12/2013 | Monte | G01S 5/0027 340/426.1 |

(Continued)

FOREIGN PATENT DOCUMENTS

| DE | 29503057 U1 | 4/1995 |
| WO | 2010051287 A1 | 5/2010 |

OTHER PUBLICATIONS

International Search Report and Written Opinion issued in PCT/ 2015/052065 dated Mar. 28, 2017.

(Continued)

*Primary Examiner* — Phung Nguyen
(74) *Attorney, Agent, or Firm* — Heslin Rothenberg Farley & Mesiti P.C.

(57) ABSTRACT

A system, apparatus and method for alerting an emergency responder to an emergency, which includes a processor obtaining data from at least one sensor, determining, that the data indicates an emergency condition, based on the determining, obtaining location information and a unique identifier, and communicating the location information and the unique identifier to a node via a network connection.

19 Claims, 15 Drawing Sheets

(56) References Cited

U.S. PATENT DOCUMENTS

| | | |
|---|---|---|
| 2003/0197095 A1 | 10/2003 | Preston |
| 2005/0219950 A1* | 10/2005 | Rowe .................. G01S 5/0226 367/118 |
| 2006/0148423 A1* | 7/2006 | Sharpe ................ A63B 29/021 455/90.1 |
| 2007/0177651 A1 | 8/2007 | Daugherty et al. |
| 2010/0227585 A1 | 9/2010 | Carroll et al. |
| 2011/0298613 A1 | 12/2011 | Ayed |
| 2012/0136923 A1* | 5/2012 | Grube ..................... H04W 4/90 709/203 |
| 2012/0265477 A1 | 10/2012 | Vock et al. |
| 2012/0286933 A1* | 11/2012 | Hsiao .................. G08B 25/016 340/8.1 |
| 2013/0016449 A1 | 1/2013 | Crandall |
| 2013/0060168 A1 | 3/2013 | Chu et al. |
| 2013/0278416 A1* | 10/2013 | Button ................. G01S 5/0072 340/539.13 |

OTHER PUBLICATIONS

International Search Report on Patentability issued in PCT/2014/054210 dated May 19, 2015.

* cited by examiner

◯ SHOCK / PRESSURE SENSORS

▢ HEAT SENSORS

EMERGENCY NOTIFICATION APPARATUS AND METHOD

CROSS REFERENCE TO RELATED APPLICATIONS

The present application is a continuation of U.S. patent Non-provisional application Ser. No. 14/227,493, filed Mar. 27, 2014, now U.S. Pat. No. 9,311,801 entitled "Emergency Notification Apparatus," which claims priority from U.S. provisional patent application No. 61/805,573, filed Mar. 27, 2013, entitled, "Avalanche Ready (SVR) System," which are both hereby incorporated herein by reference in their entirety.

FIELD OF INVENTION

The Invention relates generally to an apparatus and method to alert emergency services personnel to a need for assistance. The use of this system can be configured for use in geographic regions that are sparsely populated that feature uneven terrain as well as in densely populated urban environments, and/or outdoor recreation areas.

BACKGROUND OF INVENTION

Many pastimes can require individuals to explore isolated terrain, thus leaving these individuals stranded in the event of an unforeseen emergency, such as a medical emergency and/or weather-related hazard. For example, in the winter, many outdoor sports come with the risk of the participant being injured and possibly stranded in calamitous events (e.g., avalanches).

In fact, millions of people throughout the world enjoy outdoor activities that expose them to the perils of snow-related accidents. Every year many avid outdoor sportsmen and women are victimized by snow-related disasters associated with unanticipated avalanches. Although great efforts are dedicated toward pre-emptive control of potential avalanches, backcountry and on-piste skiers, off-piste skiers, snowboarders, snowshoers, mountaineers, hikers and snowmobilers fall victim to the perils of being buried by avalanches.

In most cases, there are precious minutes available to the timely location and rescue of avalanche victims, particularly when they are incapacitated physically by being buried and unable to move or breathe or rendered unconscious. Timely search and rescue of avalanche victims is essential if lives are to be saved.

A disadvantage of present systems and methods is that they are only operational if the person with the emergency device, for example, the position-indicating radio beacon (EPIRB), is conscious and is physically able to activate the device.

In addition to well-trained and equipped and experienced search-and-rescue teams, present methods of avalanche rescue utilize a multi-faceted approach, and sometimes combine known methods, which include avalanche cords, beacons, probes, shovels, and the RECCO rescue system. The RECCO system is a two-part system, which includes a rescue team with hand-held devices, which detect "reflectors," which are small passive transponders, which can be affixed to outerwear, boots, helmets and other types of body-protection components of individuals.

Another search tool that is utilized often in conjunction with RECCO, is avalanche beacons. In use since 2000, avalanche beacons are devices worn by individuals who activate a radio signal indicating an emergency. The radio-emitting beacon is picked up by rescue transceivers, using a digital display, thus helping to locate the victim within a reasonably tight range of location. However, this system requires that the victim be conscious and physically capable of activating the beacon-emitting signal apparatus.

A challenge of present methods is that they are not integrated into a single solution. Thus, many adventurers utilize a variety of different tools at once, in the hopes that one works in the event of an emergency. In fact, in 2010, the French National Association for the Study of Snow and Avalanches (ANENA) recommended that all off-piste skiers should carry beacons, probes, shovels and RECCO reflectors. In addition to this recommendation, many backcountry adventurers also carry: SPOT satellite GPS messengers, Mountain Locator Units (MLU), Personal Locator Beacons (PLB) and Globalstars.

SUMMARY OF INVENTION

Shortcomings of the prior art are overcome and additional advantages are provided through the provision of a method for alerting an emergency responder to an emergency, the method includes: obtaining, by a processor, data from at least one sensor; determining, by the processor, that the data indicates an emergency condition; based on the determining, obtaining, by the processor, location information; based on the determining, obtaining, by the processor, a unique identifier; communicating, by the processor, the location information and the unique identifier to a node via a network connection.

Computer systems, computer program products, wearable objects, and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

The foregoing and objects, features, and advantages of one or more aspects of the invention are apparent from the following detailed description taken in conjunction with the accompanying drawings in which.

DETAILED DESCRIPTION OF THE INVENTION

Figure 1:
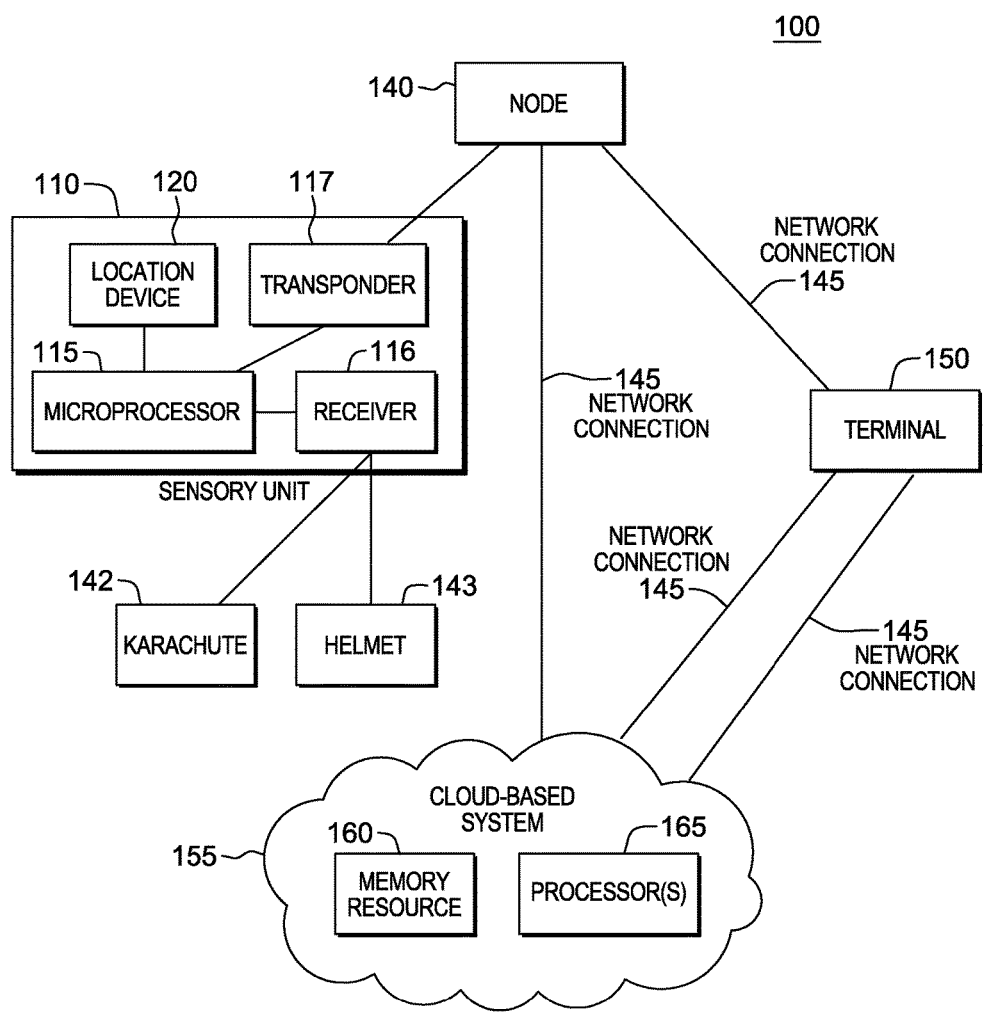
FIG. 1 is an embodiment of a system that practices one or more aspects of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

Embodiments of the present invention enable individuals who are in distress, but may or may not be conscious, to alert emergency response personnel of their needs for assistance. Although the present invention can be utilized in emergency response situations beyond avalanche-related emergencies, this situation is referenced throughout the application as a possible scenario in which embodiments of the present invention may be utilized and are effective in providing swift emergency response.

Embodiments of the present invention can be activated automatically to alert search and rescue personnel to the precise location of the victim using the most current sophisticated GPS systems available.

Embodiments of the present invention utilize a combination of a sensory unit (SU) and a location device, i.e., a device capable of obtaining the location of an individual and representing it in a manner that can be communicated to emergency responders. Embodiments of the present invention utilize a variety of location devices, including but not limited to one or more of a GPS transponder, an accelerometer, and/or a personal navigation system, to provide an alert to emergency personnel and to communicate information to the emergency personnel that the personnel can utilize in locating and rescuing an individual.

The SU is a wearable device that is assembled in a ring-like configuration and contains a series of interconnected pressure sensors. These sensors are aligned to correspond with each other and thus detect circumferential pressure loads. Once a pre-determined pressure threshold is achieved, the device communicates with the SU, which pulls coordinates from the location device. This permits virtually instantaneous transmission of information to search and rescue personnel and can effect an expeditious response and rescue efforts. In embodiments of the present invention, the location device is integrated into the SU.

In embodiments of the present invention, once the location device transmits information to a network, the information can be obtained both by the emergency responders and by a cloud-based communication system, which supplements the information from the location device with additional information that can prove helpful in locating an individual in distress and arriving with the correct resources to make this rescue. The supplemented information is also received by rescue personnel via a communications network. Although a cloud-based system is disclosed, the individual components of the system, including the SU, including the location device, can be adapted for use with systems that do not include the cloud-based communications system discussed, including but not limited to, communications networks utilized in existing method of search and rescue.

The SU and location device can be configured to communicate with further elements of a system in order to provide a more comprehensive alert system. For example, the SU and location device can work in conjunction with a helmet with integrated shock/impulse loading detection sensors, and the helmet, belt, a proprietary combined kite-parachute system, referred to herein as a Karachute™, with integrated sensors, and location device can ultimately communicate with a cloud-hosted alert system that can communicate enhanced distress-related information to emergency personnel.

Although the present application discusses how the various system elements work together, one of skill in the art will recognize that the individual elements of the system, as well as the system as a whole, can be configured to work with the existing emergency response systems utilized by emergency responders.

Each element of the present system will be reviewed in the present application. However, FIG. 1 provides an overview of an exemplary interaction between elements of an embodiment of a system that practices one or more aspects of the present technique. In FIG. 1, the system 100 includes an SU 110, which includes a location device 120, including but not limited to a GPS and/or an accelerometer. Adapted for communicating with a microprocessor 115 integrated into the SU 110, are some additional external communication devices, which include, in this present embodiment, one or more sensors integrated into a helmet 143, and one or more sensors integrated into the aforementioned proprietary Karachute™ 142. As will be discussed in detail later, the microprocessor 115 in the SU 110 can obtain alerts and/or information from any sensor through known wireless and/or wired communication protocols. Upon obtaining an alert and/or information that program code executed by the microprocessor 115 determines is problematic, the microprocessor 115, by executing program code, will communicate with a transponder 117, which will communicate with a communication node 140, such as an antenna. The node 140 routes this communication over a network 145 to at least one terminal 150 accessible by an emergency responder.

Embodiments of the present invention may concurrently communicate this information, and identification information from the SU, to a cloud-based system 155 that will supplement the identification information and/or the geographic information utilizing information stored in one or more cloud-based memory resources 160. The supplemental information is routed, by program code executed by one or more processors 165 in the cloud-based system 155, to the at least one terminal 150 accessible to the emergency responder. In some embodiments of the present invention, the node 140 will route the information from the SU 110 to the terminal 150 and the cloud-based system 155 concurrently, while in some embodiments, the information may go to the terminal 150, then to the cloud-based system 155, where it is supplemented, and then back to the terminal 150. In some embodiments, the information from the SU 110, including the location and identification information, may be routed by the node 140, first, to the cloud-based system 155, where it is supplemented, and then, to the terminal 150.

The microprocessor 115 in the SU 110 is configured to obtain information and alerts from sensors that are both internal and external to the SU 110, via a receiver 116 and communicate this information via a transponder (or transmitter) 117, to a node 140. In an embodiment of the present invention, sensors are integrated into the SU 110, into an external Karachute™, and into an external helmet. Embodiments of this helmet and Karachute™ are discussed in this application. These external items are offered as examples as depending upon the activity in which the wearer of the SU is engaged, the detection of sensors in different areas will prove helpful in alerting emergency responders to a condition that requires a response.

Figure 2:
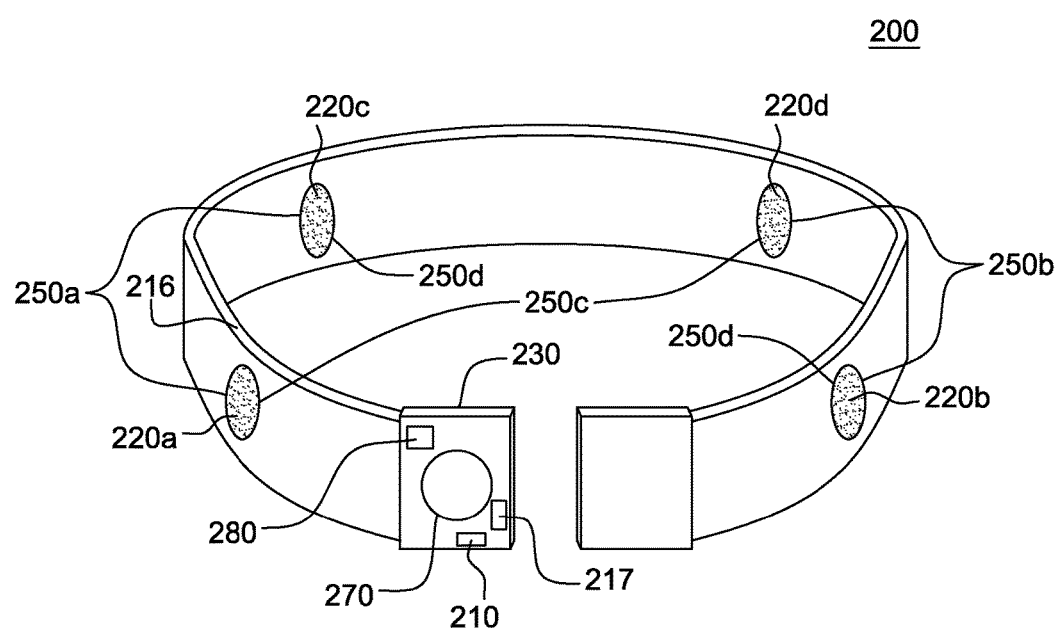
FIG. 2 depicts aspects of an example of a sensory unit utilized in an embodiment of the present invention.

Referring to FIG. 2, in an embodiment of the present invention the SU 200 comprises a belt-like device that can be wrapped around an individual and be activated by a non-obtrusive fastening device 230. The fastening device may include buckles, snaps, etc., or any mechanism known in the art that is adapted to close a belt. This fastening device 230 may be designed to accommodate a battery used to power the SU 200, for example, a rechargeable battery (not pictured).

In order to detect extrinsic pressure loads placed on the chest of an individual, the SU 200 can be positioned circumferentially about the thoracic region of the body (i.e., chest) of the wearer. This placement would enable the SU 200 to passively detect loads placed on the chest of the wearer that would compromise the ability of the victim to breathe. In an embodiment of the present invention, the SU 200 can be integrated into the clothing of the wearer, for example, it can be passed through a pocket-like lining or sleeve in the user's garment (e.g., ski jacket). In addition to being threaded through a sleeve in a garment, as discussed in FIGS. 3A-3I, the SU may be integrated directly into a garment 393, for example, by being sewn or otherwise affixed into a base layer of a garment, such as a shirt.

Figure 3B:
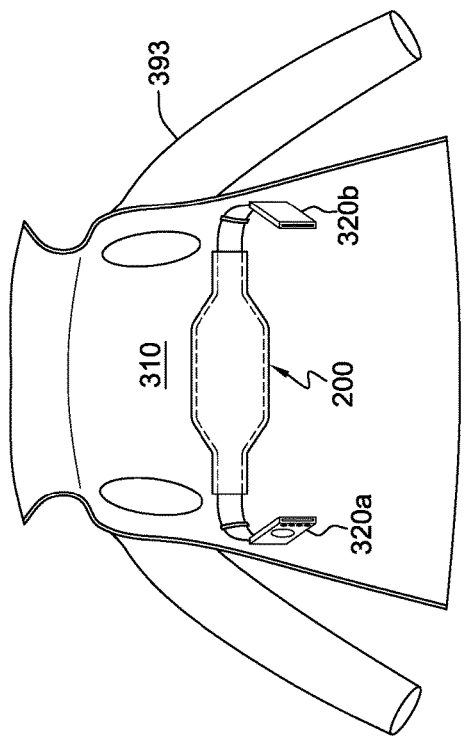
FIGS. 3A-3I depict embodiments of aspects of garments adapted to accommodate an embodiment of a sensory unit in accordance with at least one aspect of the present invention.
Figure 3E:
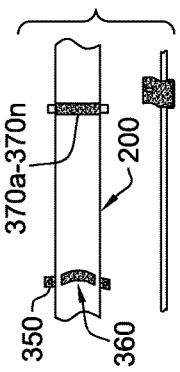
Figure 3D:
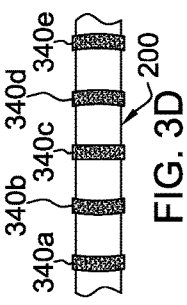
Figure 3G:
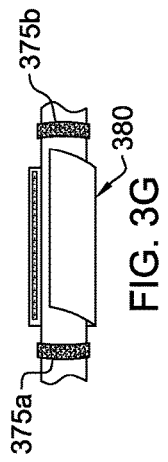
Figure 3A:
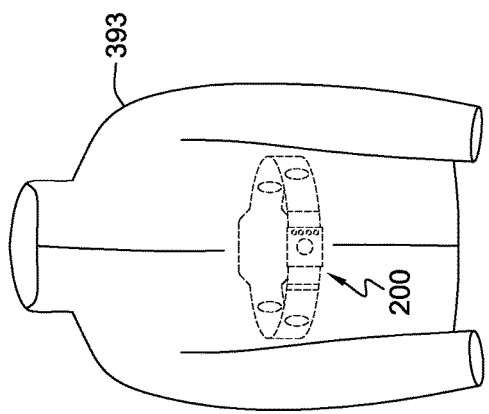

FIGS. 3A-3I depict embodiments of aspects of garments adapted to accommodate an SU 200. FIG. 3A shows the positioning of an SU 200 within a garment 393, which in this example, is a jacket. For ease of understanding, the SU 200 is referred to by the same number in FIGS. 3A-3I, as in FIG. 2. FIGS. 3A-3I provide some examples of integrations of the SU 200 into clothing. For ease of understanding, in a number of the figures, the garment 393 is labeled consistently. The SU 200 would not be visible (externally) to an individual observing someone wearing this garment 393.

FIG. 3B depicts the same garment 393 as FIG. 3A, but from a different perspective. In FIG. 3B, the garment 393 is shown with the closure open so that the SU 200 is visible. The SU 200 is secured inside the garment 393 with a panel of material 310, which it is threaded through, as well as at least two belt loops 320*a*-320*b*.

FIGS. 3C-3I depict different ways of securing the SU within a garment 393.

Figure 3C:

In FIG. 3C, material is folded over the SU 110, and the sleeve 330 is secured at the top, for example, with Velcro.

In FIG. 3D, the SU 200 is secured using textile loops 340*a*-340*e*, which the SU 200 is threaded through.

In FIG. 3E, the garment (not pictured) is outfitted with snaps 350 and the SU 200 has at least one strap 360 affixed to it with snaps 370*a*-370*n* that will connect with the snaps 350 on the garment.

Figure 3F:
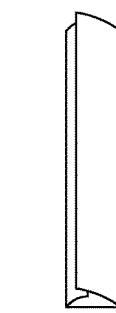

FIG. 3F shoes a tri-fold sleeve 365 used to secure the SU 200 within a garment.

FIG. 3G shows the SU 200 being secured inside a garment with a combination of loops 375*a*-375*b* and a sleeve 380, which is similar to the sleeve 330 in FIG. 3C.

Figure 3I:
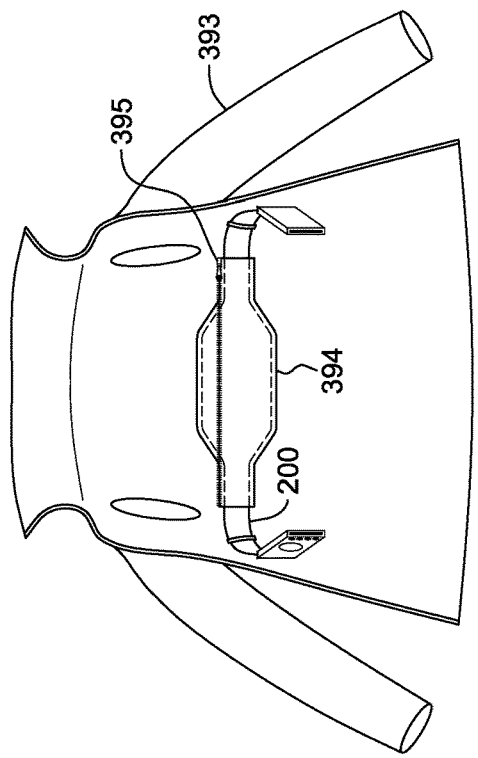
Figure 3H:
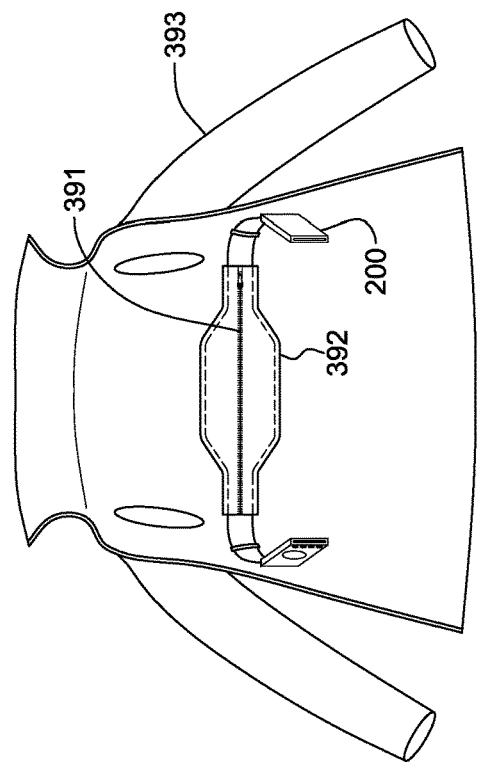

FIG. 3H depicts a sleeve 392 with a zipper 391 oriented horizontally along the center of the sleeve 392, inside a garment 393, securing an SU 200. In another embodiment, FIG. 3I depicts a sleeve 394 similar to the sleeve 392 in FIG. 3H, but, in FIG. 3I, a zipper 395 is oriented at the top of the sleeve 394 where the top of the SU 200 is aligned when inserted into this sleeve 394.

Figure 6:
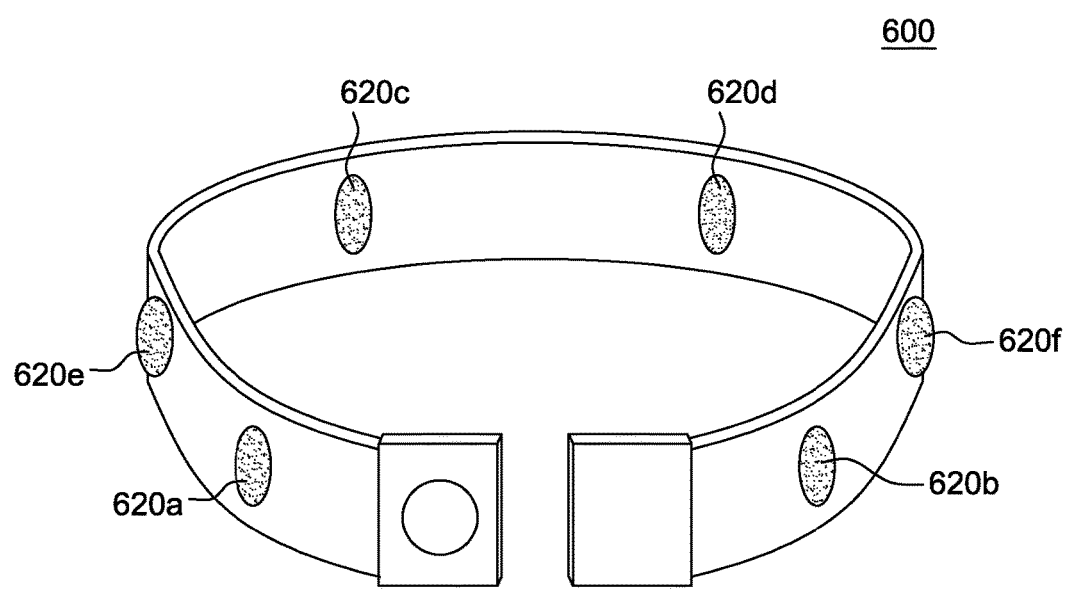
FIG. 6 depicts aspects of an example of a sensory unit utilized in an embodiment of the present invention.

Returning to FIG. 2, the embodiment of FIG. 2 includes four sensors, however this number is one example of a possible configuration for an embodiment of the apparatus. This document also describes a six-sensor configuration, as seen in FIG. 6. This, too, is also an example of an embodiment of the present invention. Based upon some uses of the SU 200, the SU 200 can comprise two or more sensors. Uses that utilize two or more sensors include off-piste skiing. However, as will be described later, some embodiments of the SU do not include any sensors.

Returning to FIG. 2, in some embodiments of the present invention, the SU 200 is also equipped with a manually-operated button 270 for activation by a surviving victim in the event that they are not incapacitated or unconscious. As seen in FIG. 2, the manually-operated button 270 can be located on the fastening device 230 at the front and center of the user's thoracic region. Some embodiments of the SU 200 include a manually-operated button 270, but do not include sensors.

In some embodiments of the present invention, integrated into the SU 200, for example at the closure in close proximity to the manually-operated button 270, is a user-identification device 280, including but not limited to, a memory chip, RFID tag, etc. This identification device can assist receiving party(s) (e.g., search-and-rescue personnel, ski patrol, ski resort emergency response teams, etc.) in identifying the distressed victim expeditiously. In embodiments of the present invention, the identification device can also assist rescue personnel in identifying pertinent medical conditions and/or needs associated with the distressed victim.

As aforementioned, in an embodiment of the present invention, the SU 200 is comprised of interconnected pressure sensors that are preconfigured to communicate with a location device, to receive location information, when the pressure on a predetermined number of the sensors 220*a*-220*d* exceeds a preconfigured threshold. An embodiment of the present invention utilizes one or more FlexiForce Pressure Sensors, however, any commercial or custom sensor may be integrated into the SU provided that it is capable of detecting pressure loads. The FlexiForce Pressure Sensor is mentioned as an example because it can detect constant and consistent loads. However, this embodiment is a non-limiting example.

Each sensor 220*a*-220*d* in the SU 200 can be individually communicatively coupled to a microcontroller (not pictured) that is also integrated into the SU. As seen in FIG. 2, the microcontroller 210 acts as a communications hub for the components of the SU. The microcontroller 210 includes one or more integrated circuits that include(s) a processor core, memory, and programmable input/output peripherals.

The sensors 220a-220d are configured to sense circumferential pressure loads, i.e., extrinsic loads/forces placed around at least most of the user's thoracic region. A transponder 217 may be integrated into the microcontroller 210 or external to the microcontroller, and program code executed by a processing resource (also referred to as the processor) in the microcontroller 210 communicates information to the transponder 217, which communicates this information externally, for example, to the node 140 in FIG. 1.

Additionally, in an embodiment of the present invention, a receiver 216 can be integrated into the SU to receive information, such as alerts, from external devices. For example, the receiver 216 enables the microcontroller 210 to receive distress signals from triggers and/or sensors in the aforementioned Karachute™ and/or helmet. Additionally, should an individual become unconscious, and/or buried under snow in an avalanche, rescue personnel could obtain information about the individual by sending a signal, such as an RF signal, to the receiver 216 in the SU 200 and this receiver could communicate with the microcontroller 210, enabling program code executed by the microcontroller 210 to send identifying information stored on a memory resource in the SU to the rescue personnel via the transponder 217.

Sensors integrated into embodiment of the SU 200 can include both smart sensors, with digital capabilities, as well as analog sensors, that are duty cycled by the microcontroller 210. The program code executed on a processor in the microcontroller 210 communicates with the sensors in different ways depending on the type of sensors. For example, while a smart sensor can communicate that a threshold is exceeded to the microcontroller 210, an analogue sensor can be continuously cycled and read by program code executed on the microcontroller 210 and this program code can determine, based on the readings, whether a threshold is exceeded. In a further embodiment of the present invention, the sensors 220a-220d remain dormant until they are exposed to pressure at a pre-configured threshold. When the sensors 220a-220d receive the requisite amount of pressure, the program code executed on the microcontroller 210 obtains information from the sensors 220a-220d. This information may comprise an alert. Embodiments of the present invention where the sensors remain dormant until triggered conserve the power source (e.g., battery) and enable the SU to work for longer periods of time without the need to recharge or replace the power source.

Figure 4:
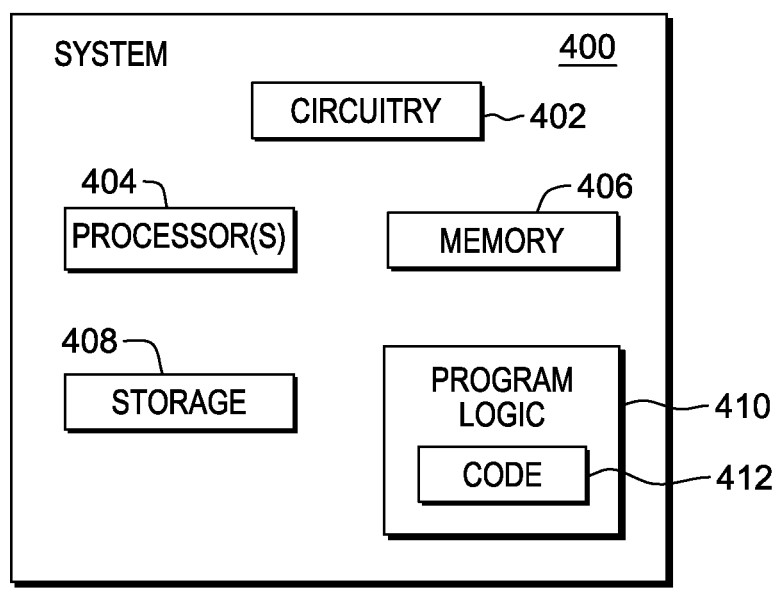
FIG. 4 depicts one embodiment of a single processor computing environment to incorporate and use one or more aspects of the present invention.

FIG. 4 illustrates a block diagram of a computer resource 400, like microcontroller 210, which is part of the technical architecture of certain embodiments of the invention. The resource 400 may include a circuitry 402 that may in certain embodiments include a microprocessor 404. The computer system 400 may also include a memory 406 (e.g., a volatile memory device), and storage 408. The storage 408 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 408 may comprise an internal storage device, an attached storage device and/or a network accessible storage device. The system 400 may include a program logic 410 including code 412 that may be loaded into the memory 406 and executed by the microprocessor 404 or circuitry 402.

In certain embodiments, the program logic 410 including code 412 may be stored in the storage 408, or memory 406. In certain other embodiments, the program logic 410 may be implemented in the circuitry 402. Therefore, while FIG. 4 shows the program logic 410 separately from the other elements, the program logic 410 may be implemented in the memory 406 and/or the circuitry 402.

Using the processing resources of a resource 400 to execute software, computer-readable code or instructions, does not limit where this code is can be stored. The terms program logic, code, and software are used interchangeably throughout this application.

Figure 5:
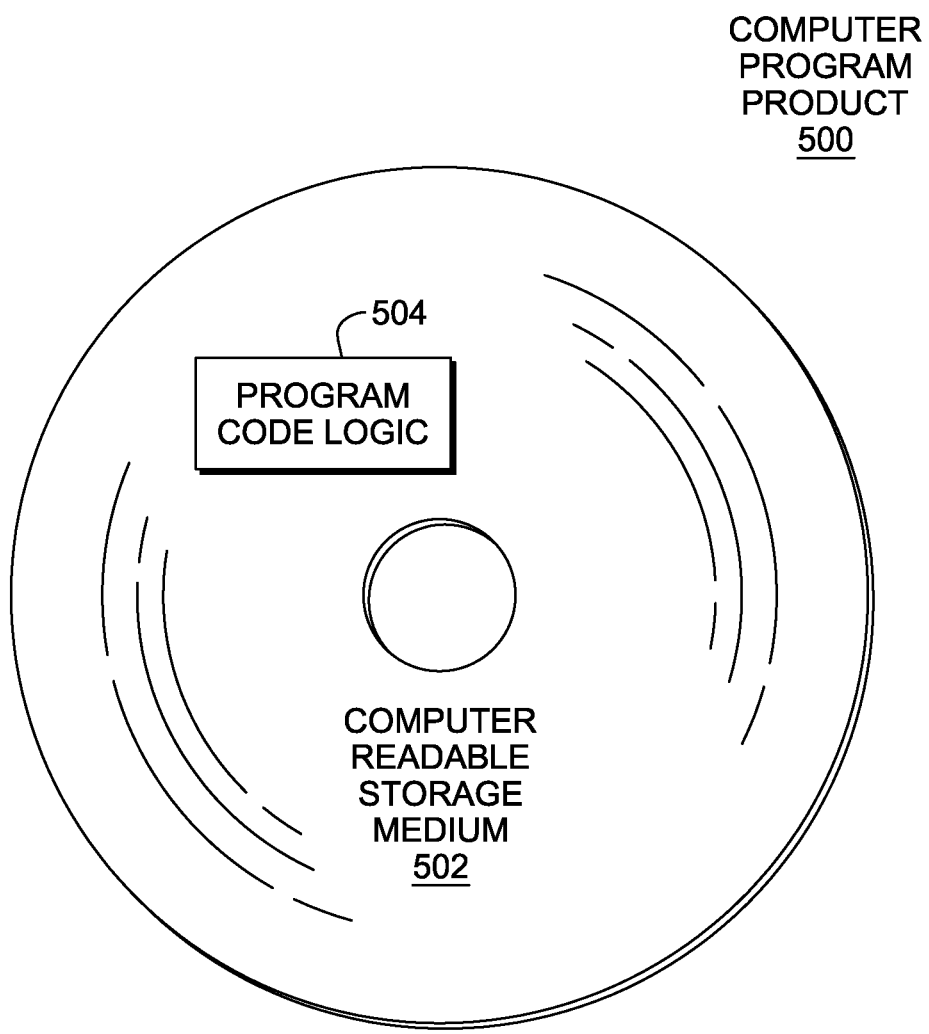
FIG. 5 depicts one embodiment of a computer program product incorporating one or more aspects of the present invention.

Referring to FIG. 5, in one example, a computer program product 500 includes, for instance, one or more non-transitory computer readable storage media 502 to store computer readable program code means or logic 504 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, assembler or similar programming languages. The program code may execute entirely on one computer resource in the system, partly on this one computer resource, as a standalone software package, partly on the computer resource and partly on a remote computer or entirely on the remote computer or server. In the latter scenario, the remote computer may be connected to the noted computer resource through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions, also referred to as computer program code, may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Returning to FIG. 2, when one or more of the sensors 220a-220d in the SU are triggered by sensing pressure at a given threshold, the sensor(s) communicate with the microcontroller 210, which processes the output of the sensors 220a-220d. Program code executed by the microcontroller and either stored on a memory resource of the microcontroller, or accessible to the microcontroller via a communications connection, such as a wireless network, is executed by one or more processors in the microcontroller to configure a pressure threshold for the SU. The threshold utilized by the microcontroller can vary in accordance with the size of the individual wearing the SU and/or the physical activity that the individual is engaged in while wearing the SU.

In addition to the load required to trigger the sensor, the amount of time that this load is sustained is also configurable. For example, an embodiment of the present invention may require the extrinsic pressure experienced at a sensor to be sustained for a predefined amount of time in order to trigger a signal. The amount of time pressure is sustained to trigger the microcontroller to communicate a distress call can be defined in the computer code executed at the microcontroller by one or more processors, by one or more of the sensors, and/or in a memory device accessible to the program code. For example, in an embodiment of the present invention, the SU may require a given number of sensors to sense consistent pressure around the thoracic region for 30 seconds before an alert signal is triggered.

In addition to the amount of pressure and the length of time this pressure is sustained to trigger the microcontroller to initiate the later-described process to call for assistance for the wearer of the SU, the number of sensors in the belt that are activated in order to meet a threshold is also configurable. For example, an embodiment like that of FIG. 2, which includes four sensors, may require consistent pressure around the thoracic region to activate at least 2 of 4 pressure sensors. In another embodiment of the SU 600 in FIG. 6, which utilizes six sensors, the activation of at least 3 of the 6 pressure sensors may be required before an alert is initiated by the microcontroller.

In embodiments of the present invention, to maintain a level of safety, the pressure threshold of the SU is not configurable by an individual user, but it is configurable by manufacturers. To set a threshold, the manufacturer can connect an input device to the microcontroller and load program code that can be executed by a processor in the microcontroller. In an embodiment of the present invention, when a customer purchases an SU, the SU will have been calibrated in advance to a specific minimum threshold.

As explained earlier, the way that the program code executed by the microcontroller determines the pressure on the sensor(s) satisfies a pre-configured threshold can be dependent upon the type of functionality of the sensors utilized in the SU. For example, while an active sensor could notify the microcontroller upon a triggering event, program code executed on the microcontroller would duty cycle passive sensors to check for readings that exceed the pre-configured thresholds.

Program code executed by the microcontroller can configure the individual sensors in the SU that are communicatively coupled to the microcontroller. For example, Flexi-Force Pressure Sensors, which are a non-limiting example of a type of sensor that can be utilized in an SU, may have a variety of pre-determined maximum thresholds (e.g., 25 lbs, 50 lbs, 100 lbs, etc.), which can then be configured to a specific threshold by the program code executed by the microcontroller.

Returning to FIG. 2, an arrangement of the pressure sensors 220a-220d is depicted to show an orientation adapted to sense pressure when the SU 200 is worn around the thoracic region of the wearer. Two of the sensors 220a-220b, are oriented at the front of the SU, when worn as a belt by the wearer, and two 220c-220d of the sensors, are oriented on the back of the belt, when worn. In an embodiment of the present invention, in order to trigger an alert, i.e., in order for the program code executed by one or more processors in the microcontroller to obtain information from the sensors that would cause the program code to initiate an alert, at least two of the four sensors 220a-220d sense a pre-defined amount of pressure for a pre-defined amount of time. The configuration of sensors that can trigger the microcontroller to communicate with a node 140, such as that in FIG. 1, is adapted on different embodiments of the present invention in order to accommodate problems experienced by the wearer related to different activities. Embodiments of the invention that meet the described pressure thresholds, by obtaining information from two sensors, that are located one at the front of the wearer, and the other, at the back of the wearer, are designed to trigger the microcontroller to communicate an issue when the breathing of the wearer may be constricted.

In the embodiment of FIG. 2, only certain combinations of the sensors 220a-220d will trigger the alert. In one embodiment of the present invention, two sensors positioned on the same side of the belt, e.g., first sensor pair 250a, sensor 220a and sensor 220c, and/or second pair, sensor 250b pair sensor 220b and sensor 220d, when activated together for a given amount of time at a given pressure, would trigger an alert (in communication with the microcontroller as described). In an embodiment of the present invention, two sensors oriented diagonally from each other would also trigger an alert under the conditions described, e.g., third sensor pair 250c, sensor 220a and sensor 220d, and/or fourth sensor pair 250d, sensor 220b and sensor 220c. In the embodiment of FIG. 2, if the two rear-oriented sensors, sensor 220d and 220c, or just the two front-oriented sensors, sensor 220a and sensor 220b, experience the threshold pressure for the threshold amount of time, the program code will not initiate an alert.

FIG. 6 is an SU 600 with six sensors 620a-620f. Like the embodiment of the SU 100 in FIG. 1, the embodiment of the SU 600 in FIG. 6, comprises two sensors oriented towards the front of a wearer, a first sensor 620a and a second sensor 620b, and two sensors oriented toward the rear of a wear, a third sensor 620c and a fourth sensor 620d. However, this SU 600 also includes two additional sensors which are oriented at the side of a wearer, a fifth sensor 620e and a sixth sensor 620f. In this embodiment of the present invention, at least three of the six sensors can trigger an alert, by the program code executed by one or more processors in the microcontroller (not pictured). However, in some embodiments of the present invention, only certain combinations of three sensors can trigger an alert. For example, the embodiment of FIG. 6 requires that the three sensors that trigger an alert include one sensor positioned on the front of the SU 600, one sensor positioned at the rear of the belt, and one sensor positioned on a side of the belt.

When program code executed by one or more processors in the microcontroller obtains information that the threshold number of sensors have sensed pressure in accordance with the pre-configured conditions, program code executed by a processing resource in the microcontroller pulls information from the location device, and communicates with the transponder to alert (ultimately) emergency personnel over a communications network. This communication is described in reference to FIG. 1.

In an embodiment of the present invention, the pressure sensors on the SU are in constant communication with the microcontroller as the program code receives continuous pressure readings from each sensor at a configurable rate, for example, one reading per sensor per second, and/or one reading per sensor per every five seconds. These interval windows are offered as an example as the window between readings, as aforementioned, is configurable. Thus, it is the program code executed by one or more processors in the microcontroller that determines when a threshold for sending an alert has been met based on the pressure readings obtained. In a further embodiment of the present invention, each sensor communicates with the microcontroller when a pre-configured threshold is exceeded.

Returning to FIG. 2, as aforementioned, in addition to the pressure sensors 220a-220d, embodiments of the present invention may include a manually-operated button 270. In an aspect of an embodiment of the present invention, this manually-operated button 270 is coupled to the microcontroller and when the manually-operated button 270 is depressed for a predefined amount of time, the program code executed on the microcontroller obtains an alert. In an embodiment of the present invention, after the user manually depresses the button for a first amount of time, for example, three seconds, the manually-operated button 270 generates an audio/vibration/buzzer alert, which acts as feedback to the user that an alert signal may be sent and obtained by the microcontroller. Should the user continue to depress the manually-operated button 270 for a second time period, for example, two seconds, the alert is only then obtained by the microcontroller. As aforementioned, embodiments of the present invention may include a manually-operated button 270 but do not include pressure sensors 220a-220d.

The amount of false positives generated by the system can be controlled in different ways in different embodiments of the present invention. In some embodiments of the present invention, the manually-operated button 270 can be configured to send an alert only if depressed a certain amount of time. In further embodiments of the present invention, the conditions for program code executed at the microcontroller to determine whether the readings from the pressure sensors should trigger an alert can be configured.

Should an embodiment of the present invention include both a manually-operated button 270 and passive sensors 220a-220d, these devices are communicatively coupled to the microcontroller, which is coupled to a power supply, all located in the SU 200.

The microcontroller is powered by a power supply that includes at least one battery. In embodiments of the present invention, one or more batteries can be situated either in the belt buckle and/or in the rear portion of the belt. Alternate embodiments of the present invention may integrate more than one battery into the SU in order to provide backup power. The power supply, whether it includes one or more batteries, and/or one or more solar cells, is electrically coupled to the microcontroller in the SU.

Figure 7:
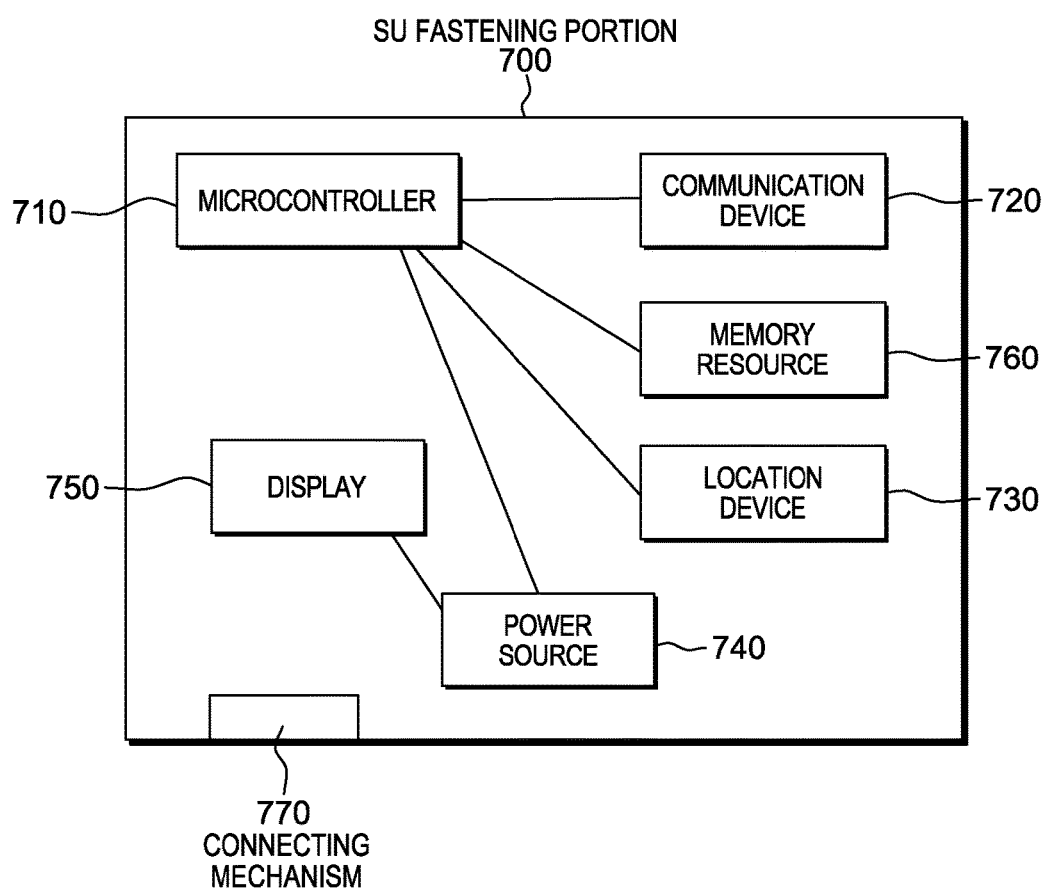
FIG. 7 depicts aspects of an example of a sensory unit utilized in an embodiment of the present invention.

FIG. 7 is a diagram of certain aspects of an embodiment of an SU. FIG. 7 is an embodiment of the fastening portion and/or buckle of an SU. The fastening portion 700 includes a microcontroller 710, an external communication device 720, for example, a transmitter or a transponder, a location device 730, including but not limited to a GPS and/or an accelerometer, a power source 740, including but not limited to a one or more batteries or solar cells, and a display 750, including but not limited to, an LED and/or an LED array.

In the embodiment of FIG. 7, the display 750, which is observable by the wearer of the SU, indicates the power remaining in the power source 740. The power source 740 powers the location device 730 and/or the microcontroller 710, and/or the communication device 720. The microcontroller 710 includes a memory resource 760, including but not limited to internal memory and/or a flash drive. The memory resource 760 contains a unique identifier.

In an embodiment of the present invention, when the program code executed by a processor in the microcontroller 710 obtains a notification indicating either that the threshold has been met on the pre-defined number of sensors (not pictured), and/or a manually operated button (not pictured) has been depressed by the user, program code executed by a processing resource in the microcontroller 710 obtains location information from location device 730, pulls the identifier from the memory resource 760, and sends this information to the communication device 720, for transmission to a node of a communications network.

Regarding the power source 740, depending upon the activities the SU is worn during, certain batteries may provide important advantages. For example, when the SU is utilized to communicate a hazard experienced by a user that was created by an avalanche, rechargeable lithium ion batteries are useful because these batteries last about 5 12-hour days on a single charge, can withstand cold temperatures and moisture, and come in compact sizes that are easily integrated into the SU (e.g., 1"×2" sizes). For avalanche-related use, the Panasonic CR 2032 battery can also be used in conjunction with a lithium ion battery and/or be substituted for that battery.

Returning to FIG. 7, the fastening portion 700 depicted in this figure also includes a connecting mechanism 770, which enables an individual to connect the SU directly to an external computing device. This connection can be utilized to upload new program code into the microcontroller 710, to recharge the power source 740, diagnose issues with the microcontroller 710, and collect data from the SU by interacting with the microcontroller. Standard communication ports such as USB ports and mini-USB ports can be utilized in various embodiments of the present invention.

To provide protection for the power source when the SU is under pressure, the power source can be contained in a molded housing. In some embodiments of the present invention, the housing is molded to accommodate the power source, the microcontroller, and the connecting mechanism 770, for example, a USB connector. In one embodiment of the present invention, a flap of a malleable and durable material, including but not limited to, rubber, and/or silicone, covers the USB port, which served as the connecting mechanism 770, in this embodiment, and can be moved in order to provide access to the USB connector for recharging purposes. In this embodiment, when not in use, the USB port can be covered by the flap in order to ensure water resistance.

Returning to FIG. 2, in an embodiment of the present invention, in order to enable the SU 200, the fastening device 230 is engaged.

Figure 8:
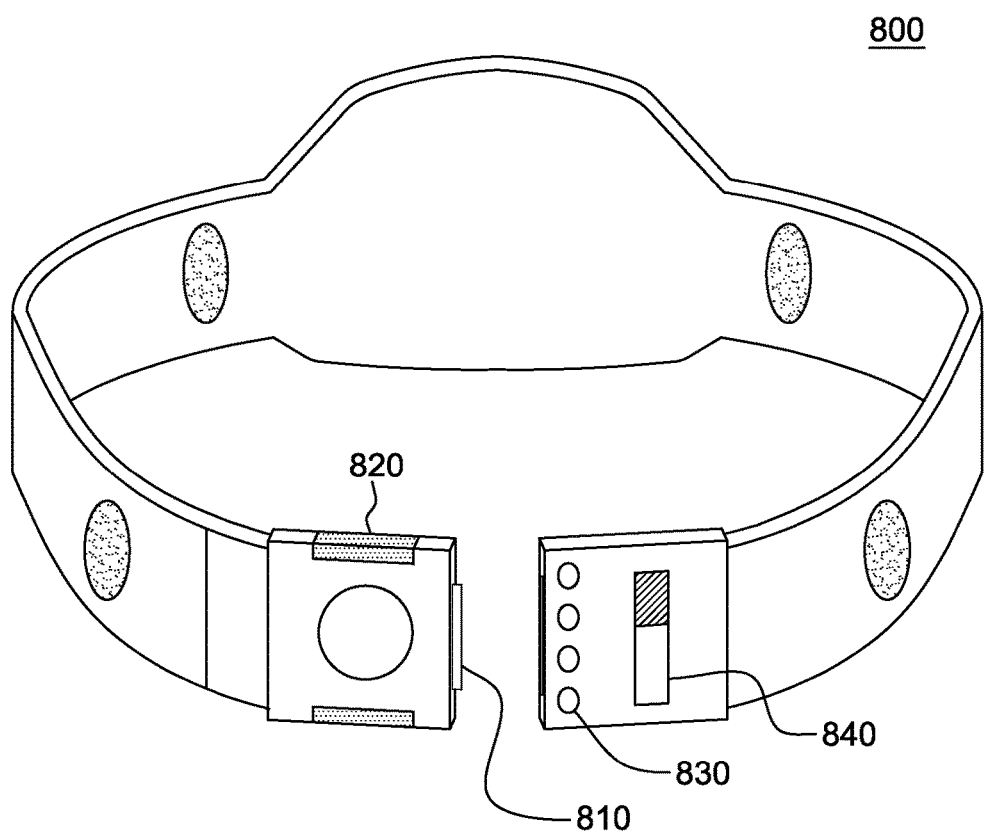
FIG. 8 depicts aspects of an example of a sensory unit utilized in an embodiment of the present invention.

As seen in FIG. 8, a micro-switch 810 inside the fastening device clasp 820, when engaged, activates the SU 800. Once the fastening buckle is securely closed, permitting the male/female electrodes in the corresponding buckle ends to complete the electrical circuit, the SU 800 is activated. This coupling will activate the aforementioned display 830, providing visual confirmation of the SU 800 activation. In an embodiment of the present invention, the display 830 alerts the user that the device is enabled and how much power is left in the power supply. In this embodiment, when the micro-switch is triggered, switches inside the fastening device engage and turn on the device and LED lights 830 display the current battery life on the fastening device.

Returning to FIG. 2, in some embodiments of the present invention, the fastening device 230 may include a method of turning the SU 200 on and/or off, including but not limited to, an ON/OFF switch, a button, a trigger, etc. In an embodiment of the invention that includes this switch, rather than engaging the fastening device 230 alone to engage the system, the user turns ON the belt via the ON/OFF switch in order for it to be able to detect pressure loads and send alert signal. Thus, in some embodiments of the present invention, enabling the SU 200 is a two step process, first, the fastening device 230 in engaged, and second, the ON/OFF switch is engaged.

Returning to FIG. 8, an example of the ON/OFF switch 840 is pictured in this figure as well.

Embodiments of the present invention that require a wearer to manually turn the SU 200 on after first engaging the fastening device 230 present an advantage to the wearer because by requiring a wearer to enable the fastening device 230, the amount of false positives can be diminished.

As part of the SU itself, the fastening device can be concealed in a specially-adapted insert in a garment 393, as noted in FIGS. 3A-3I. Thus, the device, and the SU itself, would be almost unnoticeable to the user when he/she wears the SU.

Figure 9:
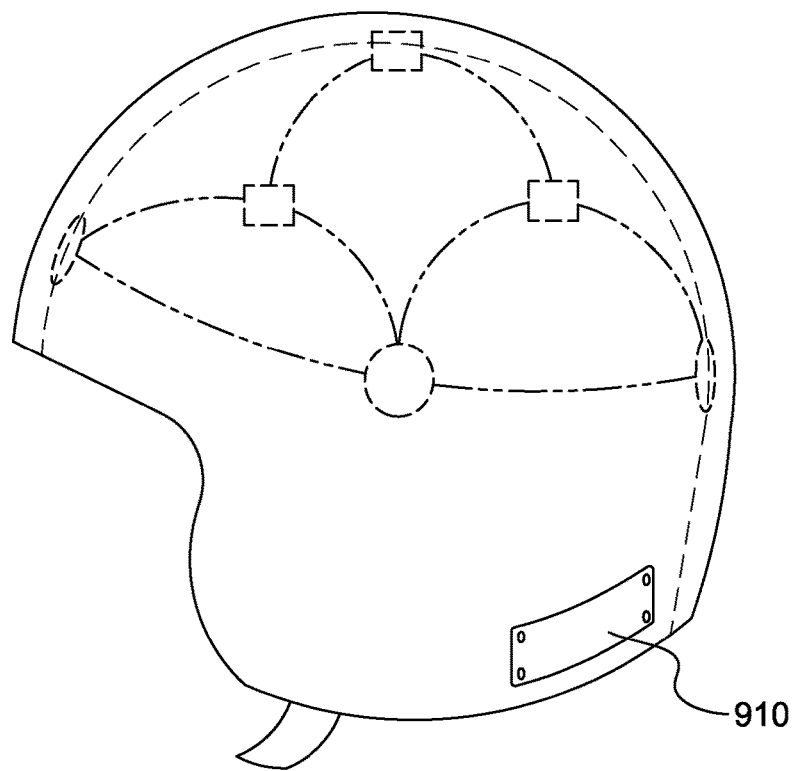
FIG. 9 is an embodiment of a helmet for communication with a sensory unit in an embodiment of the present invention.

Per the discussion accompanying FIG. 1, the SU 110 can receive signals from sensors and triggers external to the SU 110, including but not limited to, a helmet 143, and a Karachute™ 142. FIG. 9 is an embodiment of a helmet for communication with the SU 110 and FIG. 10 is an embodiment of a Karachute™ 142.

As seen in FIG. 9, an embodiment of a helmet 900 for use with the present invention includes both heat sensors and shock/pressure sensors. The configuration of these sensors in FIG. 9 is meant as an example as depending upon the activity that the wearer of the SU is engaged in, different sensor configurations as well as in different helmet shapes can be advantageous. For example, embodiments of the helmet adapted for skiing may vary from those adapted for riding a snowmobile, motorcycle, and/or bicycle. The heat sensors receive a given threshold of heat in order for the helmet to be active. The heat threshold prevents the microcontroller in the SU from receiving alerts from the helmet 900 when the helmet 900 is not in use, i.e., being worn. The shock/pressure sensors can be either passive sensors or active sensors, or a combination of both. When a shock/pressure threshold is met, the program code executed by a processor in the microcontroller in the SU will receive this information from the sensors in the helmet 900. The microcontroller receives this information in embodiments of the present invention via a receiver in the SU. Upon receipt of a notification from one or more sensors, the microcontroller will obtain location information from the location device, and/or identification information from the memory resource, and communicate via a transponder with an external node, as described earlier. In an embodiment of the present invention, the program code executed by the microcontroller in the SU obtains information from the sensors in the helmet via a transceiver 810 in the helmet.

Figure 10:
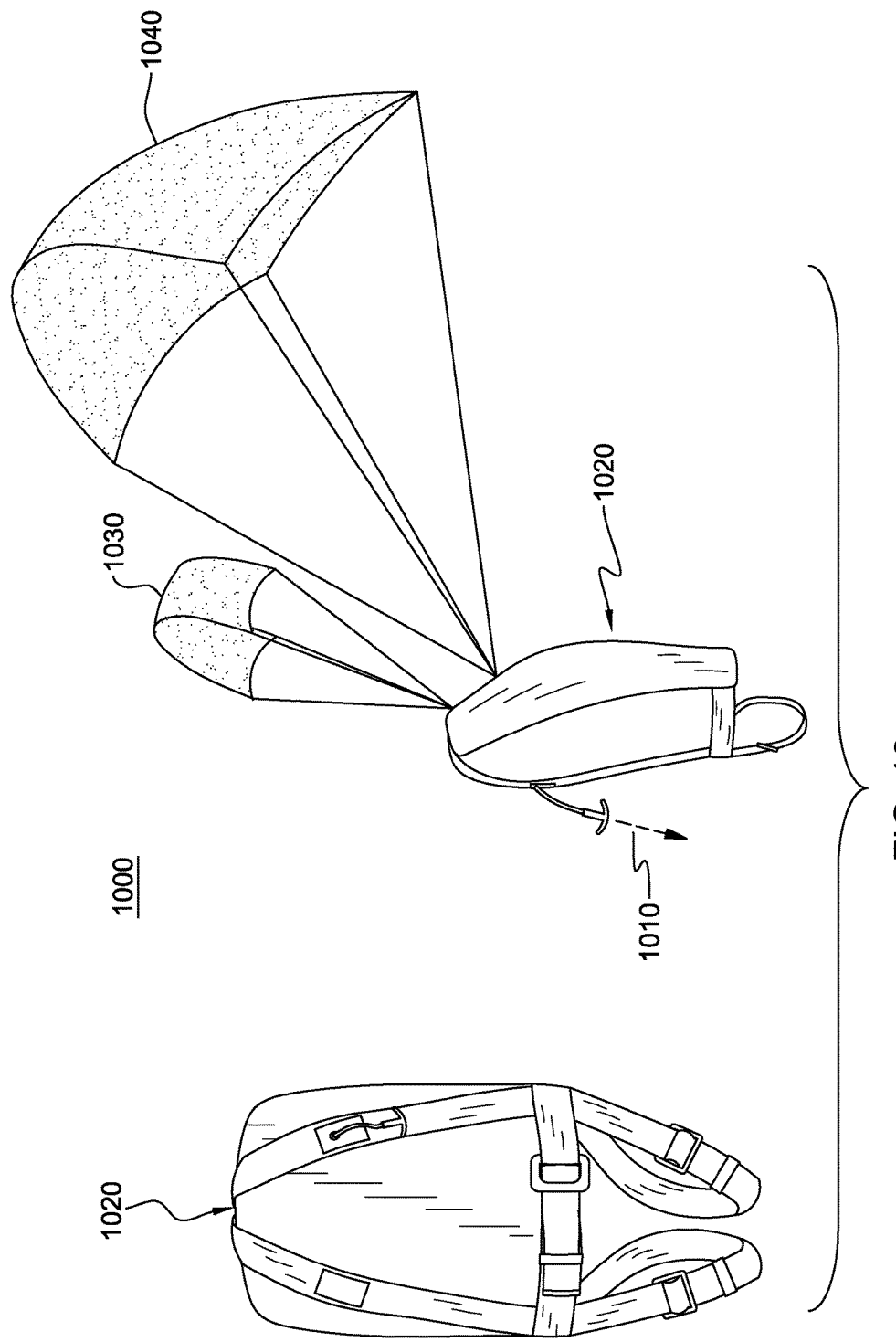
FIG. 10 is an embodiment of an example of an apparatus used to communicate with a sensory unit in an embodiment of the present invention.

FIG. 10 depicts an apparatus referred to earlier as a Karachute™ 1000, which is a combined kite-parachute system that protects its wearer during catastrophic natural events, such as an avalanche. As seen in FIG. 10, the Karachute™ 1000 includes a folded kite-parachute apparatus that is integrated into a backpack 1020. This backpack 1020 is worn by an individual.

In an embodiment of the present invention, when the wearer senses an emergency condition, for example, an avalanche beneath his/her skis or snowboard, the wearer pulls an activation draw cord, which causes the backpack 1020 to deploy a kite 1030 and a parachute 1040 and to communicate with the SU. This activation is a three-stage process: 1) a canopy kite 1030 is deployed from the backpack 1020 to provide the wearer with lift and ability to float over the subjacent avalanche; 2) a parachute 1040 is deployed from the backpack 1020 to slow the movement of the wearer; 3) the draw cord activates a sensor in the Karachute™ (not pictured), which communicates with a receiver in the SU.

When the SU receives an alert from the Karachute™ 1000, program code executed by a processor in the microcontroller can communicate with an external node, as described in FIG. 1.

As discussed earlier, when program code executed by a processor in the microcontroller determines that predefined threshold conditions have been met based on data obtained from the sensors and/or when the microcontroller receives an indicator from the manually-operated button, program code executing one or more processors in the microcontroller communicates wirelessly with the location device to initiate an alert that can be responded to by emergency response personnel.

In an embodiment of the present invention, once the microcontroller has communicated with the transmitter, the location device is able to communicate via a communications network with emergency personnel and to a cloud-based system, as described in FIG. 1.

In embodiments of the present invention, the transponder or other communication device (in response to program code executed by a processing resource in the microcontroller) in the SU communicates with a node exterior to the SU, which communicates with a terminal accessed by an emergency responder, and then communicates with a cloud-based communication system, which includes at least one memory resource. Program code executed in the cloud-based communication system receives the identifier from the communications connection, either from the node and/or from the emergency responder's terminal, and supplements the identifier with information about the individual wearing the SU.

In embodiments of the present invention, sensitive information describing the wearer can be stored encrypted and/or transmitted encrypted in compliance with any regulations and/or best practices.

Supplemental information includes, but is not limited to, the identity of the individual, biographical and anatomical data describing the individual, health-related data, and/or emergency contact information related to individuals to contact in case this individual is in distress. In this manner, program code executing in the cloud-based communication system assists emergency responders in identifying the wearer of the SU that communicated the alert so that the emergency responders are better prepared to assist the wearer of the SU with the emergency.

As explained earlier, the identifier is stored in the SU. This unique identifier is what allows the cloud-based communication system to provide useful information to emergency responders. In an embodiment of the present invention, a purchaser of an SU can access the cloud-based communication system over a network connection and provide information to the cloud-based communication system. Program code executing on a resource of the system will store the information on one or more memory resources of this system and link it to the identifier. In this way, this information will be available for retrieval in case of an emergency.

As understood by one of skill in the art, this information can be obtained by the cloud-based communication system in a variety of ways. For example, at the point-of-sale, the purchaser of an SU may be provided with secure login information that will enable this user to access one or more resources of the cloud-based communication system using a terminal connected to the Internet.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Figure 11:
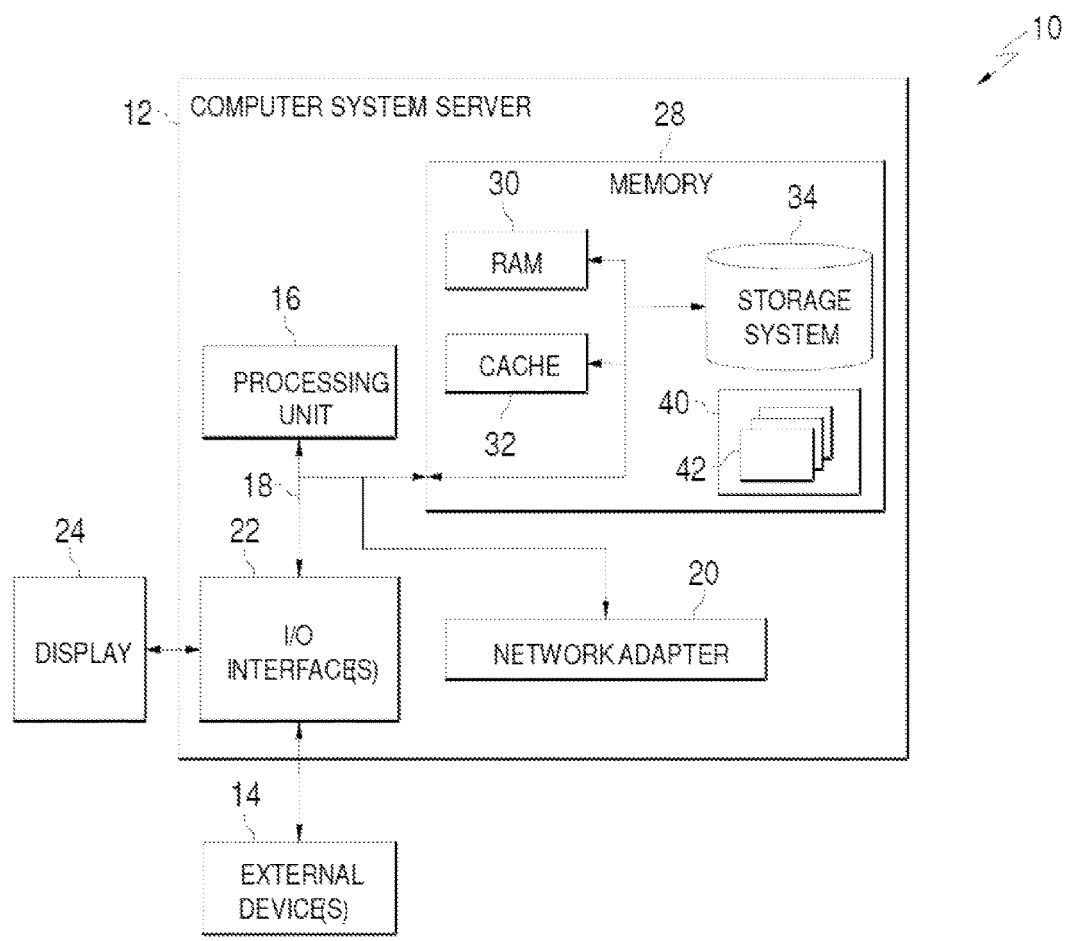
FIG. 11 depicts a cloud-computing node according to an embodiment of the present invention.

Referring now to FIG. 11, a schematic of an example of a cloud-computing node is shown. Cloud-computing node 10 is only one example of a suitable cloud-computing node and is not intended to suggest any limitation as to the scope of use or functionality of embodiments of the invention described herein. Regardless, cloud-computing node 10 is capable of being implemented and/or performing any of the functionality set forth hereinabove.

In cloud-computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud-computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing devices that are linked through a communications network. In a distributed cloud-computing environment, program modules may be located in both local and remote computer system storage media including memory storage devices.

As shown in FIG. 11, computer system/server 12 in cloud-computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
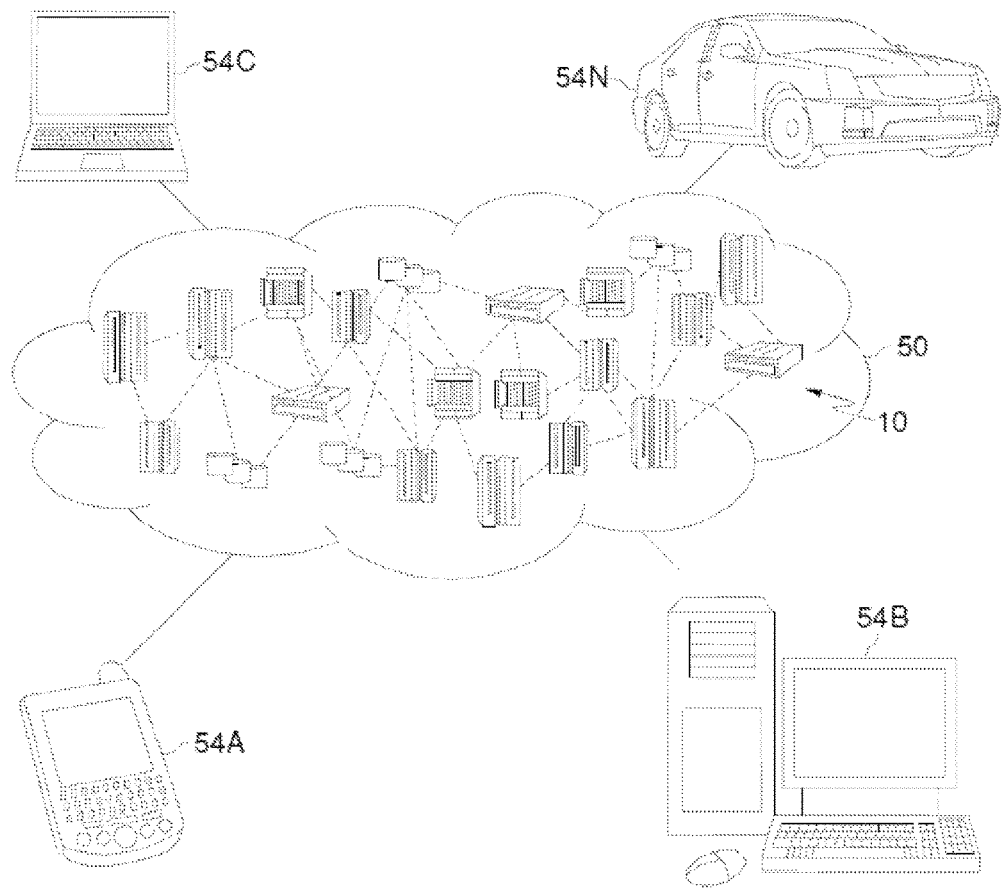
FIG. 12 depicts a cloud-computing environment according to an embodiment of the present invention.

Referring now to FIG. 12, illustrative cloud-computing environment 50 is depicted. As shown, cloud-computing environment 50 comprises one or more cloud-computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud-computing environment 50 can communicate with any type of computerized device over any type of network and/or network addressable connection (e.g., using a web browser).

Figure 13:
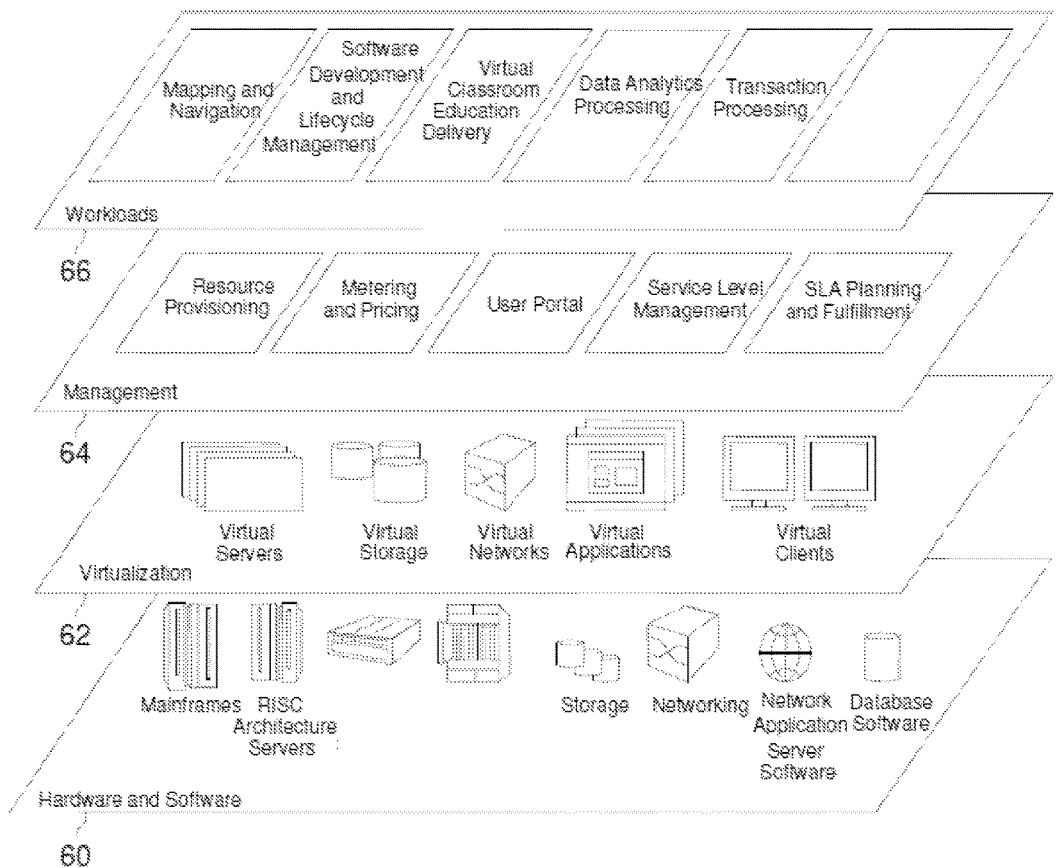
FIG. 13 depicts abstraction model layers according to an embodiment of the present invention.

Referring now to FIG. 13, a set of functional abstraction layers provided by cloud-computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided: Hardware and software layer 60 includes hardware and software components. Examples of hardware components include mainframes; RISC (Reduced Instruction Set Computer) architecture based servers; storage devices; networks and networking components. Examples of software components include network application server software; and database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud-computing environment. Metering and Pricing provide cost tracking as resources that are utilized within the cloud-computing environment, and billing or invoicing for consumption of these resources. In one example, these resources may comprise application software licenses. Security provides identity verification for cloud consumers and tasks, as well as protection for data and other resources. User portal provides access to the cloud-computing environment for consumers and system administrators. Service level management provides cloud-computing resource allocation and management such that required service levels are met. Service Level Agreement (SLA) planning and fulfillment provide pre-arrangement for, and procurement of, cloud-computing resources for which a future requirement is anticipated in accordance with an SLA.

Workloads layer 66 provides examples of functionality for which the cloud-computing environment may be utilized. Examples of workloads and functions which may be provided from this layer include: mapping and navigation; software development and lifecycle management; virtual classroom education delivery; data analytics processing; transaction processing; and emergency search and rescue.

Figure 14:
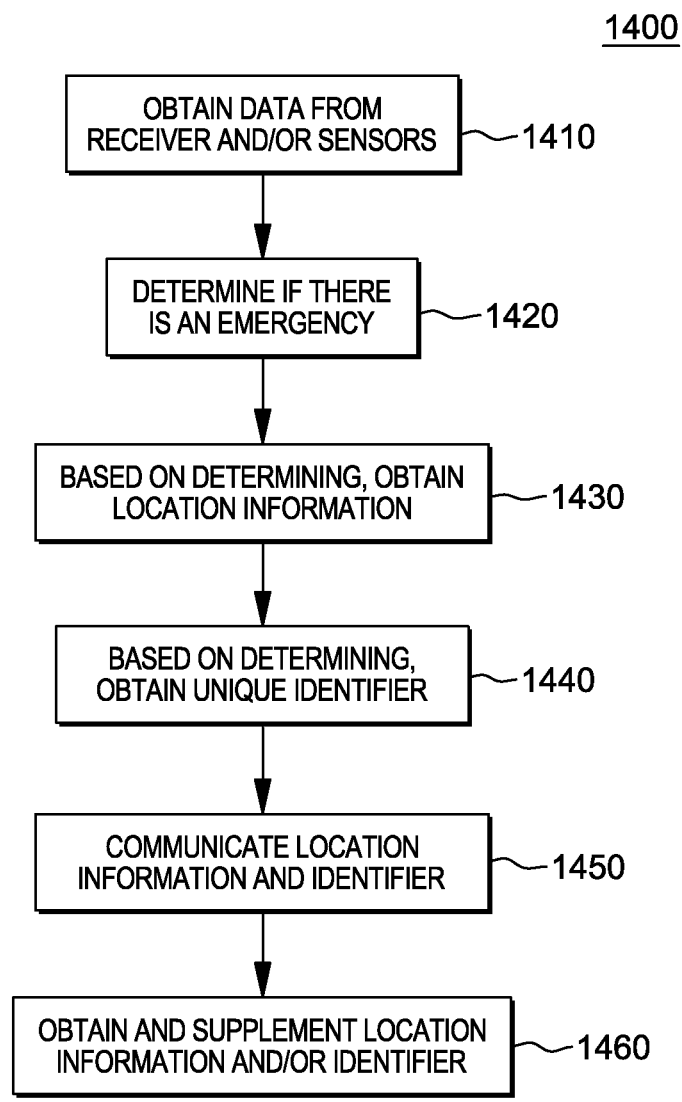
FIG. 14 depicts a workflow of aspects of an embodiment of the present invention.

FIG. 14 is a diagram that is an example of a workflow 1400 of aspects of an embodiment of the present invention of an exemplary system that includes aspects of embodiments of the present invention. In this embodiment, program code executed by a processing resource of the microcontroller in the SU obtains data from the transponder and/or the sensors (1410). Based on the data, the program code determines whether there is an emergency (1420).

As discussed earlier, in embodiments of the present invention, the program code can obtain this data either from a receiver in the SU, which received this information from an external device, such as the disclosed helmet and/or Karachute™, or from cycling passive sensors in the SU and/or receiving indications from active sensors in the SU. In embodiments that do not employ smart sensors, the program code executing on a microcontroller resource will determine that there is an emergency upon receiving information from a transponder or sensors, based on applying pre-configured thresholds to the data.

Based in the program code determining that there is an emergency, the program code obtains location information from the location device (1430) and a unique identifier from a memory resource in the SU (1440). The program code then utilizes the transponder to communicate the location information and the identifier to at least one terminal (accessed, for example, by an emergency responder), and to a cloud-based communication system (1450). Program code executed by at least one cloud resource obtains the identifier and the location information and supplements the information with additional identification details and sends this information to the terminal (1460).

Below, Example 1 is a recitation of an embodiment of at least one aspect of the present invention.

Example 1

Avalanche Ready (AvR) was conceptualized to develop an instantaneous alert system when a buried avalanche victim cannot volitionally alert search and rescue personnel of their accident and location. If a victim is rendered unconscious or physically trapped and buried by the avalanche, the AvR would be activated automatically to alert search and rescue personnel to the precise location of the victim using the most current sophisticated GPS systems available.

AvR is comprised of a sensory unit (SU) and GPS transponder (location device). The SU is a device that is assembled in a ring-like configuration and contains a series of interconnected pressure sensors. These sensors are aligned to correspond with each other and thus detect circumferential pressure loads. Once a pre-determined pressure threshold is achieved, the device automatically triggers the location device. This permits virtually instantaneous transmission of information to search and rescue personnel and can effect an expeditious response and rescue efforts.

The SU component would be a slim and comfortable belt-like device that would be wrapped around the individual and be activated by a non-obtrusive fastening device (FD) (e.g., metals snaps+/-buckle). This FD would be designed to accommodate a tiny battery used to power the SU. The SU of the AvR alert system would also be equipped with a manually-operated button that could be activated by the surviving victim in the event that they are not incapacitated or unconscious.

We envision the AvR SU to be positioned circumferentially about the thoracic region of the body (i.e., chest) in order to detect extrinsic pressure loads placed on the chest that would compromise the ability of the victim to breathe.

The AvR SU will be shaped like a "belt", which will be passed through a proprietary pocket-like lining or sleeve in the user's garment (e.g., ski jacket).

Accordingly a small sample of combinations set forth in Example 1 are the following:

A1. A method for alerting an emergency responder to an emergency, the method comprising: obtaining, by a processor, data from at least one sensor; determining, by the processor, that the data indicates an emergency condition; based on the determining, obtaining, by the processor, location information; based on the determining, obtaining, by the processor, a unique identifier; communicating, by the processor, the location information and the unique identifier to a node via a network connection.

A2. The method of A2, wherein the determining comprises applying, by the processor, at least one pre-configured threshold.

A 3. The method of A1, wherein the obtaining location information comprises obtaining the location information from a location device.

A4. The method of A2, wherein the location device comprises at least one of: a GPS, or an accelerometer.

A5. The method of A1, wherein the obtaining of the unique identifier comprises obtaining the unique identifier from a memory.

A6. The method of A1, wherein the node is a node on a computer network.

A7. The method of A6, wherein the computer network comprises a cloud-based communication system comprising at least one processing resource and one memory resource.

A8. The method of A1, further comprising: communicating the location information and the unique identifier to a terminal.

A9. The method of A1, further comprising: communicating the location information and the unique identifier to a memory resource; and obtaining, from the memory resource, supplemental data based on the unique identifier.

A10. The method of A9, further comprising: communicating the supplemental data to a terminal.

B1. A computer system for alerting an emergency responder to an emergency, the computer system comprising: a memory; a processor in communications with the memory; a trigger in communication with the processor; a location device in communication with the processor; and a transponder in communication with the processor, wherein the computer system is configured to perform a method, said method comprising: obtaining, by the processor, data from the trigger; determining, by the processor, that the data indicates an emergency condition; based on the determining, obtaining, by the processor, location information from the location device; based on the determining, obtaining, by the processor, a unique identifier from the memory; communicating, by the processor, the location information and the unique identifier to a node via a network connection via the transponder.

B2. The computer system B1, wherein the determining comprises applying, by the processor, at least one pre-configured threshold to evaluate whether the data from the trigger exceeds the pre-configured threshold.

B3. The computer system of B1, further comprising a receiver in communication with the processor, wherein the obtaining of the data from the trigger comprises receiving the data by the receiver.

B4. The computer system of B1, wherein the location device comprises at least one of: a GPS, or an accelerometer.

B5. The computer system of B1, further comprising a plurality of sensors in communication with the processor and wherein the trigger comprises a pre-defined number of the plurality of sensors experiencing a pre-defined threshold of pressure.

B6. The computer system of B1, wherein the trigger comprises a manually-operated button and wherein the obtaining comprises obtaining data from the trigger based upon a pre-defined change in the position of the manually-operated button.

B7. The computer system of B1, wherein the node is in communication with a cloud-based communication system comprising at least one processing resource and one memory resource.

B8. The computer system of B1, the method further comprising: communicating the location information and the unique identifier to a terminal in communication with the node.

B9. The computer system of B1, the method further comprising: communicating the location information and the unique identifier to a second memory resource; and obtaining, from the second memory resource, supplemental data based on the unique identifier.

B10. The computer system of B9, the method further comprising: communicating the supplemental data to a terminal in communication with the node.

B11. The computer system of B10, further comprising: encrypting the supplemental data.

B12. The computer system of B1, wherein the memory, processor, the location device, and the transponder comprise a wearable object.

B13. The computer system of B12, the wearable object further comprising a power source.

B14. The computer system of B12, the wearable object further comprising a plurality of sensors and the trigger, and wherein the trigger comprises a pre-defined number of the plurality of sensors experiencing a pre-defined threshold of pressure.

B15. The computer system of B1, further comprising a receiver, wherein the trigger comprises a pre-defined number of the plurality of sensors located in a position external to the wearable object experiencing a pre-defined threshold of pressure, wherein the trigger is configured to communicate with the processor via the receiver via a wireless communication connection.

B16. The computer system of B12, wherein the wearable object is a belt.

B17. The computer system of B15, wherein the trigger is located on one of: a helmet, or a karachute.

C1. A computer program for alerting an emergency responder to an emergency, the computer program product comprising: a computer readable storage medium readable by a processing circuit and storing instructions for execution by the processing circuit for performing a method comprising: obtaining, by a processor, data from at least one sensor; determining, by the processor, that the data indicates an emergency condition; based on the determining, obtaining, by the processor, location information; based on the determining, obtaining, by the processor, a unique identifier; communicating, by the processor, the location information and the unique identifier to a node via a network connection.

C2. The computer program of C1, wherein the determining comprises applying, by the processor, at least one pre-configured threshold.

C3. The computer program of C1, wherein the obtaining location information comprises obtaining the location information from a location device.

C4. The computer program of C2, wherein the location device comprises at least one of: a GPS, or an accelerometer.

C5. The computer program of C1, wherein the obtaining of the unique identifier comprises obtaining the unique identifier from a memory resource.

C6. The computer program of C1, the method further comprising: communicating the location information and the unique identifier to a terminal; communicating the location information and the unique identifier to a memory resource; obtaining, from the memory resource, supplemental data based on the unique identifier; and communicating the supplemental data to a terminal.

D1. A wearable emergency alert apparatus, comprising: a memory configured to store a unique identifier; a processor in communication with the memory; a trigger in communication with the processor; a location device in communication with the processor; and a transponder in communication with the processor, wherein the wearable emergency alert apparatus is configured to perform a method, said method comprising: obtaining, by the processor, data from the trigger; determining, by the processor, that the data indicates an emergency condition; based on the determining, obtaining, by the processor, location information from the location device; based on the determining, obtaining, by the processor, the unique identifier from the memory; communicating, by the processor, the location information and the unique identifier to a node via a network connection via the transponder.

D2. The wearable emergency apparatus of D1, wherein the wearable emergency apparatus comprises a belt.

D3. The wearable emergency apparatus of D1, wherein the determining comprises applying, by the processor, at least one pre-configured threshold to evaluate whether the data from the trigger exceeds the pre-configured threshold.

D4. The wearable emergency apparatus of D1, wherein the location device comprises at least one of: a GPS, or an accelerometer.

D5. The wearable emergency apparatus of D1, further comprising a receiver in communication with the processor, wherein the obtaining of the data from the trigger comprises receiving the data by the receiver.

D6. The wearable emergency apparatus of D1, further comprising a plurality of sensors in communication with the processor and wherein the trigger comprises a pre-defined number of the plurality of sensors experiencing a pre-defined threshold of pressure.

D7. The wearable emergency apparatus of D1, wherein the trigger comprises a button and wherein the obtaining comprises obtaining data from the trigger based upon a pre-defined change in the position of the manually-operated button.

D8. The wearable emergency apparatus of D1, further comprising a receiver, wherein the trigger comprises a pre-defined number of the plurality of sensors located in a position external to the wearable object experiencing a pre-defined threshold of pressure, wherein the trigger is configured to communicate with the processor via the receiver via a wireless communication connection.

D9. The wearable emergency apparatus of D1, wherein the trigger is located on one of: a helmet, or a karachute.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A wearable emergency alert apparatus, comprising:
a memory configured to store a unique identifier;
a processor in communication with the memory;
a plurality of sensors in communication with the processor;
a location device in communication with the processor comprising an accelerometer;
a receiver in communication with the processor; and
a transponder in communication with the processor, wherein the wearable emergency alert apparatus is configured to perform a method, the method comprising:
    obtaining, via the receiver, by the processor, data from a trigger, wherein the trigger is selected from the group consisting of: at least one sensor of the plurality of sensors experiencing a pre-defined threshold of pressure, the accelerometer indicating motion outside of an expected pattern, and the at least one sensor of the plurality of sensors experiencing a pre-defined threshold of pressure and the accelerometer concurrently indicating motion outside of an expected pattern;
    determining, by the processor, that the data indicates an emergency condition;
    based on the determining, obtaining, by the processor, location information from the location device;
    based on the determining, obtaining, by the processor, the unique identifier from the memory;
    communicating, by the processor, the location information and the unique identifier to a node via a network connection by accessing the transponder, wherein the unique identifier is subsequently communicated to a second memory resource, which responds by providing supplemental data, based on the unique identifier, and the supplemental data is communicated to a terminal in communication with the node.

2. The wearable emergency apparatus of claim 1, wherein the wearable emergency apparatus comprises a belt.

3. The wearable emergency apparatus of claim 1, wherein the determining comprises applying, by the processor, at least one pre-configured threshold to evaluate whether the data from the trigger exceeds the pre-configured threshold.

4. The wearable emergency apparatus of claim 1, wherein the location device comprises a GPS.

5. The wearable emergency apparatus of claim 1, wherein the pre-defined number of the plurality of sensors are located in a position external to the wearable object experiencing a pre-defined threshold of pressure, wherein the trigger is configured to communicate with the processor via the receiver via a wireless communication connection.

6. The wearable emergency apparatus of claim 1, further comprising a power source.

7. The wearable emergency apparatus of claim 6, further comprising a port adjacent to the power source so that the power source can be charged by connecting a charging cable to the port.

8. The wearable emergency apparatus of claim 6, further comprising a display oriented on an outside surface of the apparatus, wherein the display is configured to display the power level of the power source.

9. A wearable emergency alert apparatus, comprising:
a memory configured to store a unique identifier;
a processor in communication with the memory;
a button in communication with the processor;
a location device in communication with the processor, the location device comprising an accelerometer;
a receiver in communication with the processor, wherein the obtaining of the data from the trigger comprises receiving the data by the receiver; and
a transponder in communication with the processor, wherein the wearable emergency alert apparatus is configured to perform a method, the method comprising:
    obtaining, via the receiver, by the processor, data from a trigger, wherein the trigger comprising a pre-defined change in position of the button and data from the accelerometer indicating motion outside of an expected pattern;
    determining, by the processor, that the data indicates an emergency condition;
    based on the determining, obtaining, by the processor, location information from the location device;
    based on the determining, obtaining, by the processor, the unique identifier from the memory; and
    communicating, by the processor, the location information and the unique identifier to a node via a network connection by accessing the transponder, wherein the unique identifier is subsequently communicated to a second memory resource, which responds by providing supplemental data, based on the unique identifier, and the supplemental data is communicated to a terminal in communication with the node.

10. The wearable emergency apparatus of claim 9, wherein the button is located in a position external to the wearable object experiencing a pre-defined threshold of pressure, wherein the trigger is configured to communicate with the processor via the receiver via a wireless communication connection.

11. The wearable emergency apparatus of claim 9, further comprising a power source.

12. The wearable emergency apparatus of claim 11, further comprising a port adjacent to the power source so that the power source can be charged by connecting a charging cable to the port.

13. The wearable emergency apparatus of claim 11, further comprising a display oriented on an outside surface of the apparatus, wherein the display is configured to display the power level of the power source.

14. The wearable emergency apparatus of claim 9, wherein the location device comprises at a GPS.

15. The wearable emergency apparatus of claim 9, wherein the wearable emergency apparatus comprises a belt.

16. A method of utilizing a wearable emergency alert apparatus, comprising:
    wearing the wearable emergency alert apparatus by a person such that a trigger on the wearable emergency alert apparatus is located in a position external to the wearable apparatus capable of experiencing a pre-defined condition indicating an emergency situation, and wherein the trigger is configured to communicate with a processor in the wearable emergency alert apparatus via a receiver in the wearable emergency alert apparatus, the wearable emergency alert apparatus further comprising:

a memory in communication with the processor configured to store a unique identifier;

a location device in communication with the processor, the location device comprising an accelerometer; and a transponder in communication with the processor, experiencing, by the trigger, the pre-defined condition indicating the emergency situation, wherein the trigger comprises at least one sensor of a plurality of sensors and the pre-defined condition indicating the emergency situation is selected from the group consisting of: the at least one sensor experiencing a pre-defined threshold of pressure, the accelerometer indicating motion outside of an expected pattern, the at least one sensor experiencing a pre-defined threshold of pressure and the accelerometer concurrently indicating motion outside of an expected pattern, and receiving an input from the at least one sensor based on the person manually adjusting the at least one sensor;

based on experiencing the predefined emergency situation, the trigger communicating data to the processor via the receiver via a wireless communication connection and responsive to the communicating;

obtaining, by the processor, location information from the location device and the unique identifier from the memory; and communicating, by the processor, the location information and the unique identifier to a node via a network connection by accessing the transponder, wherein the unique identifier is subsequently communicated to a second memory resource, which responds by providing supplemental data, based on the unique identifier, and the supplemental data is communicated to a terminal in communication with the node.

17. The method of claim 16, wherein the pre-defined condition comprises the at least one sensor experiencing a pre-defined threshold of pressure and the accelerometer concurrently indicating motion outside of an expected pattern.

18. The method of claim 16, wherein the pre-defined condition indicating the emergency situation comprises the accelerometer indicating motion outside of an expected pattern.

19. The method of claim 16, wherein the wearable emergency apparatus comprises a belt.

* * * * *